United States Patent [19]

Ishibai et al.

[11] 4,284,325

[45] Aug. 18, 1981

[54] EYE SPAN ADJUSTMENT MECHANISM FOR BINOCULARS

[75] Inventors: Isao Ishibai, Machida; Kunimitsu Kobayashi, Higashimurayama, both of Japan

[73] Assignee: Hoya Corporation, Tokyo, Japan

[21] Appl. No.: 108,097

[22] Filed: Dec. 28, 1979

[30] Foreign Application Priority Data

Jun. 4, 1979 [JP] Japan ................................ 54/68796

[51] Int. Cl.³ ........................ G02B 7/06; G02B 7/11; G02B 7/12
[52] U.S. Cl. ...................................... 350/36; 350/47; 350/76
[58] Field of Search ................................. 350/73–77, 350/46, 47, 145, 146, 36; 354/25

[56] References Cited

U.S. PATENT DOCUMENTS

| 2,845,842 | 8/1958 | Leitz et al. | 350/75 |
| 4,123,765 | 10/1978 | Isono | 354/25 |
| 4,162,123 | 7/1979 | Isono | 354/25 |

FOREIGN PATENT DOCUMENTS 590815  3/1925  France ...................................... 350/76

Primary Examiner—Jon W. Henry
Attorney, Agent, or Firm—Sughrue, Mion, Zinn, Macpeak and Seas

[57] ABSTRACT

Binoculars including an eye span adjustment mechanism and an automatic focussing feature. A pair of guide rails is disposed laterally in the binoculars housing. Drive rods threadedly engaged with the lens barrels are movable along the guide rails to move the lens barrels back and forth in response to rotation of a knob and adjustment rod. An automatic focussing is disposed between the lens barrel to move the ocular lens in response to an electronically produced focussing signal.

4 Claims, 4 Drawing Figures

EYE SPAN ADJUSTMENT MECHANISM FOR BINOCULARS

BACKGROUND OF THE INVENTION

The present invention relates to a mechanism for adjusting binoculars to a distance corresponding to a span length between the human eyes. More particularly, the invention relates to an adjustment mechanism for moving both lens barrels of the binoculars in the lateral direction.

As is well known, human eye spans are different according to age, sex, and individual physical characteristics. For this reason, it is necessary to provide an adjustment mechanism on binoculars for adjusting the distance of the two barrels according to the eye span of the user. There has previously been provided an adjusting mechanism in which right and left lens barrels are connected to each other by a screw so that the barrels can be moved nearer or closer to one another by bending the connected portions. However, in this prior art construction, it is very difficult to provide an adjustment for the resistance to movement provided by the screw which connects the right and left lens barrels. The prior art construction is thus disadvantageous in that the barrels are either too hard to move or are too loose to maintain a desired span length.

Moreover, it is impossible to apply such a prior art mechanism to automatic focus detecting-type binoculars as proposed in copending United States patent application Ser. No. 74,354, filed Sept. 10, 1979 by the present applicants since the relationships among the right and left lens barrels and the intermediate connecting parts thereof is variable. In such binoculars incorporating an automatic focus detecting system, it is required that both lens barrels and the control connecting parts be maintained in the horizontal or lateral direction. In automatic detecting binoculars, a focus detecting element module is disposed between the right and left lens barrels in the central connecting portion and the oculars are moved so that the two images through the two lens barrels coincide to thereby implement the focussing operation automatically. In contrast, in the prior art construction in which the position relation among the lens barrels and the connecting portion are varied, it would be impossible for the respective images focussed through both lens barrels to be properly formed on the focus detecting element module.

It is a primary object of the invention to overcome the above-noted defects inherent in the prior art construction. Specifically, it is an object of the invention to provide an automatic eye span adjustment mechanism capable of compatible operation with automatic focussing binoculars.

SUMMARY OF THE INVENTION

In accordance with these and other objects of the invention there is provided an eye span adjusting mechanism for binoculars in which guide rail means is provided extending from the right to the left provided in a housing of the binoculars. The right and left lens barrels are movable along the guide rail means in the horizontal direction to thereby adjust the eye span distance so that the adjustment of the eye span distance is readily and positively achieved with the resulting mechanism being applicable to automatic focus detecting binoculars.

DESCRIPTION OF THE PREFERRED EMBODIMENTS

Figure 1:
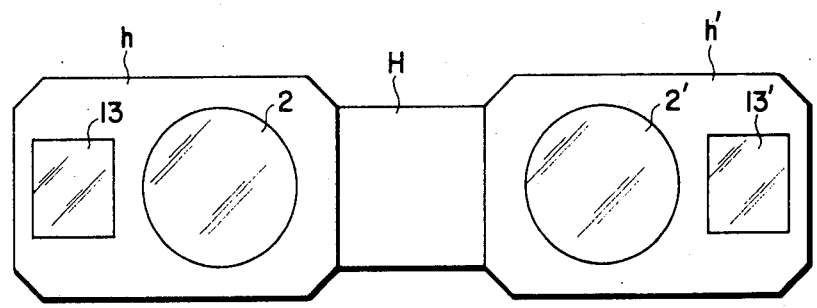
FIG. 1 is a front view of a preferred embodiment of binoculars according to the present invention.
Figure 2:
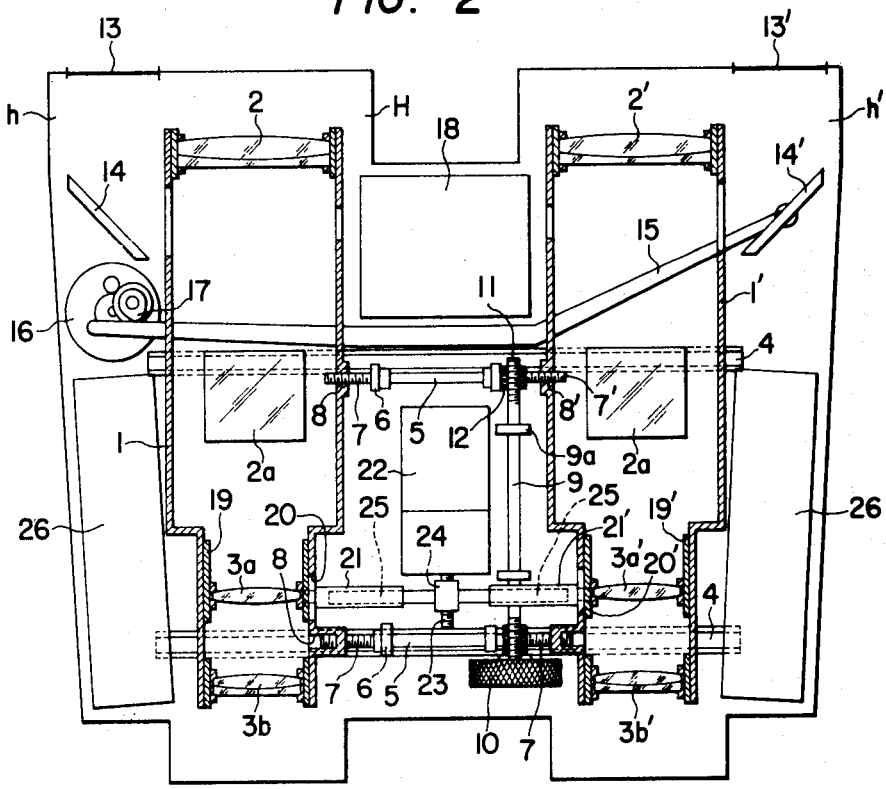
FIG. 2 is a plan sectional view of the embodiment of FIG. 1.
Figure 3:
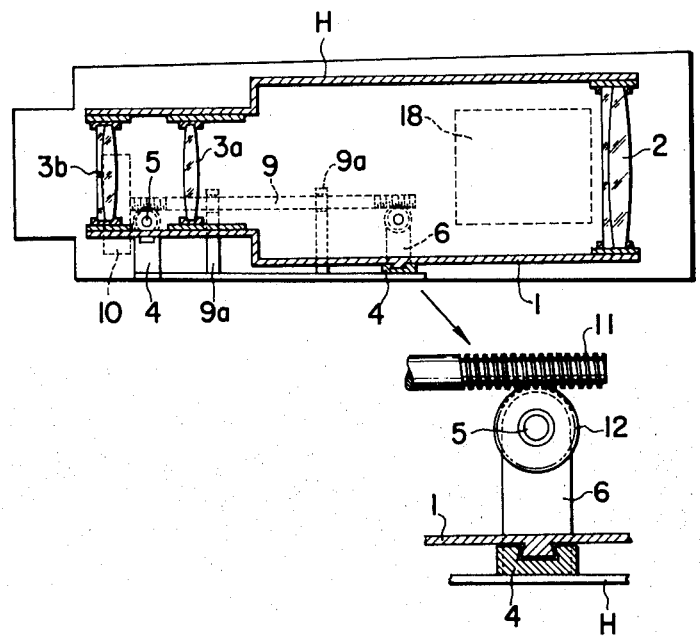
FIG. 3 is a cross sectional view of the embodiment of FIG. 1.
Figure 4:
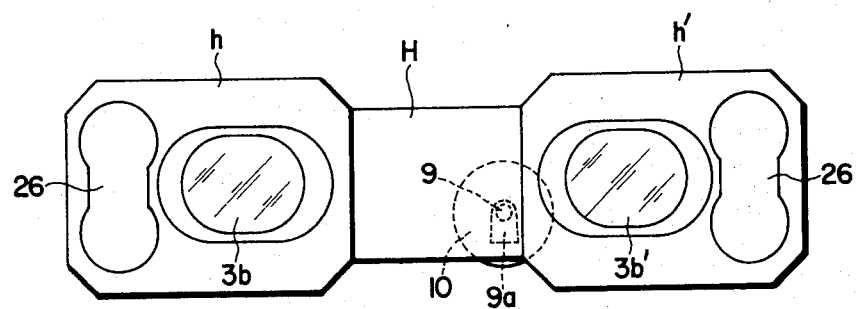
FIG. 4 is a back view of the embodiment of FIG. 1.

The present invention will hereinafter be described with reference to the accompanying drawings.

The present invention is adapted to be applied to the binoculars with an automatic focus detecting mechanism such as proposed in the aforementioned U.S. patent application Ser. No. 74,354. The reference character H denotes a housing of the binoculars with a pair of receiving portions h and h' for the right and left lens barrels 1 and 1'. The receiving portions 1 and 1' house objectives 2 and 2', prisms 2a and 2a', movable oculars 3a and 3a', and fixed oculars 3b and 3b' therein, respectively. The lens barrels 1 and 1' are slidably mounted along a pair of guide rails 4 which are positioned in the housing H along the lateral direction, that is, in a direction perpendicular to the lens barrels 1 and 1'. Namely, in the embodiment shown, a pair of front and rear guide rails 4 are formed in the bottom of the housing H with the objective side and the ocular sie respectively supported by the front and rear guide rails. The intermediate structure between the guide rails 4 and the lens barrels 1 and 1' may in addition be modified using a well-known mechanism to prevent the lens barrels from deviating from the guide rails. According to the preferred embodiment of the invention, a linear concave groove or the like is formed in each guide rail 4 and upside down trapezoidal projections engaged with the groove are formed at the bottom surface of each lens barrel 1 and 1'.

Disposed between the right and left lens barrels 1 and 1' are a pair of front and rear drive rods 5 each of which is rotatably journalled by bearings 6 fixed to the bottom surface of the housing H. A pair of male screws 7 and 7' are formed on both end portions of each drive rod 5 with the right and left screws 7 and 7' having opposite screw thread directions. Each end portion of each drive rod threadedly passes through a wall of each lens barrels 1 and 1'. Female screw threads 8 and 8' are formed in the right and left lens barrels 1 and 1' with the female screw threads 8 and 8' receiving the male screw threads 7 and 7'.

The drive rods 5 cooperate with an adjustment rod 9 which is journalled by bearings 9a fixed to the housing H and which is provided perpendicular to each of the drive rods 5. A knob 10 for rotation of the adjustment rod 9 is fixed to a rear end of the adjustment rod 9 on the ocular side with at least part of the adjustment knob 9 projecting from the housing H. A worm gear 11 is provided at each intersecting portion at the adjustment rod 9 between the drive rod 5 and the adjustment rod 9 in order to transmit the rotational force from the adjustment rod to the drive rod 5. A worm wheel 12 engageable with the worm gear 11 is provided on each drive rod at each intersection.

In the housing, light entry windows 13 and 13' are provided outside of the right and left objective lens 2 and 2' and reflecting members 14 and 14' are disposed inwardly of the light entry windows 13 and 13'. One of the reflecting members is a fixed reflecting member 14 and the other is a movable reflecting member 14'. A driven lever 15 is connected to the movable reflecting member 14' at one end and is provided with a drive motor 16 at the other end. An eccentric cam 17 is mounted on an output shaft of the drive motor 16 abutting the other end of the driven lever 15 which is spring-biased toward the eccentric cam 17.

Disposed between the fixed reflecting member 14 and the movable reflecting member 14' in the center of the housing H is a focus detecting element module 18 for receiving light beams from the reflecting members, the module being well-known in the art of auto-focus type cameras. In the module, when the rays of light introduced through the right and left reflecting members 14 and 14' form a coincident image, an output signal is generated in response to which the drive motor 16 for the movable reflecting member 14' is stopped and at the same time the movable oculars 3a and 3a' are moved back and forth as required to thereby carry out the focussing operation for the binoculars.

A driving mechanism for the movable oculars 3a and 3a' which are moved under the control of the focus detecting element module 18 includes the following components. A pair of supporting barrels 19 and 19' for supporting the movable ocular lenses 3a and 3a' are slidably assembled in the lens barrels 1 and 1'. A pair of sleeves 21 and 21' extending outside of the supporting barrels 19 and 19' through longitudinal holes 20 and 20' formed in the side walls of the lens barrels 1 and 1' are coupled to the supporting barrels 19 and 19', respectively. A drive motor 22 for moving the movable oculars 3a and 3a' is disposed in the center of the housing H following the focus detecting element module 18. An output shaft of the drive motor 22 is provided with a threaded screw 23 with which is engaged a nut 24. A pair of right and left push-rods 25 and 25' are fixed to the nut 24 and are freely inserted into the sleeves 21 an 21'.

The reference character 26 designates a pair of battery receiving cavities in which a dry battery is provided as a drive source for drive motors 16 and 22 and other power-requiring components in the binoculars. It is preferred to form the cavities by utilizing otherwise unused space in the housing H.

The thus constructed binoculars operates as follows. In order to adjust the eye span of the binoculars, it is necessary to rotate the rotation knob 10 projecting from the housing H in one direction, for example, in the direction in which the eye span distance decreases, to thereby rotate the adjustment rod 9. As a result, the drive rods 5 cooperating with the adjustment rod 9 through the worm gear 11 and the worm wheel 12 are rotated. Since the male screws 7 and 7' having screw threads running in opposite directions are provided at both end portions, when the drive rods 5 are rotated, the right and left lens barrels 1 and 1' are drawn to each other by the action of the female screws 8 and 8' threadedly engaged with the male screws 7 and 7'. In this case, each of the lens barrels 1 and 1' is moved in the horizontal direction while being supported by the guide rails 4. As a result, the positional relationship in the up and down direction (the front and rear direction) is not changed between the lens barrels 1 and 1' and the central focus detecting element module 18. The movable oculars 3a and 3a' in the right and left lens barrels 1 and 1' are always engaged with the drive motor 22 fixed to the central portion of the housing H. However, this is such an engagement that the push rods 25 and 25' are freely movable within the sleeves 21 and 21', respectively. Such engagement does not prevent movement of the sleeves 21 and 21' due to the presence of the push rods 25 and 25'. Therefore, the lens barrels 1 and 1' are freely movable. In this fashion, the eye span adjustment is readily positively achieved with the present invention.

The automatic focus detecting operation will hereinafter be explained. Rays of light entering through the objectives 2 and 2' pass through the prisms 2a and 2a' and images are formed by the ocular lens groups 3a, 3a', 3b and 3b'. In this case, the focal plane of the objectives and the front focus of the oculars cannot coincide. Light entry windows 13 and 13' for distance-metering are formed beside the objectives. Rays of light passing through the windows are introduced into the housing through the fixed and movable reflecting members 14 and 14'. The movable reflecting member 14' is reciprocatingly moved by a mechanism including the drive motor 16 and the layer 15. At some point of the scanning movement of the movable reflecting member 14', the image transmitted through the movable reflecting member 14' overlaps the image transmitted through the fixed reflecting member 14. At the instant when the movable reflecting member 14' passes through an angle which corresponds to the object being in focus, these two images coincide. At the time when the images coincide, the focus detecting element module 18 generates a focussing signal. Then, actuated by this signal, the drive motor output shaft is rotated and the nut 24 threadedly engaged with the output shaft is moved forward or backward. Accordingly, the movable oculars 3a and 3a' are moved forward or backward by the push rods 25 and 25' fixed to the nut 24. Thus, under the control of the electronic circuit, the oculars 3a and 3a' are moved corresponding to the distance to the object, that is, to the position corresponding to the angle of the movable reflecting member 14' at which the images coincide. In this case, the positions of the oculars are established at a position where the image surface of the objectives and the front focal position of the oculars coincide so that the focussing operation is accurately carried out.

Since the movement of the oculars is controlled according to the signal out of the electronic circuitry, movement may be commenced immediately after the dual image coincides. Specifically, by using memory circuitry, the moving operation thereof may be executed any time after the controlling signal is generated.

As mentioned above, since the right and left barrels are moved horizontally to thereby adjust the eye span distance in the eye span adjustment mechanism according to the present invention, it is possible to maintain the relationship between the lens barrels and the center of the housing constant in the back and forth direction. Therefore, the invention is fully applicable to binoculars utilizing an automatic focus detecting mechanism. Due to the absence of a screw for bending the connecting portion between the lens barrels as in the prior art mechanism of the foldable or collapsible types, the defect of the barrels being too tight or too loose inherent in the prior art mechanism are overcome by the invention. In addition, it is possible to adjust the eye span distance very smoothly and to maintain it constant with the invention. Furthermore, with the invention, the lens barrels are moved entirely within the housing, making a change of configuration due to the adjustment unnoticeable. The present invention is not limited to the specific embodiment illustrated and is applicable to ordinary binoculars having no automatic detecting system.

In the embodiments described above, both lens barrels are supported on the guide rails and both are movable. It is possible to fix one lens barrel and move the other with respect to the housing. Also, in the embodiments described, the adjustment rod 9 is perpendicular to the drive rods 5 and is rotated by rotating the rotation knob on the adjustment rod 9. It is possible to directly rotate the drive rods 5 without the adjustment rod 9. The drive rod may be driven by a drive motor.

What is claimed is:

1. Binoculars including an eye span adjustment mechanism comprising a housing, a pair of lens barrels positioned within said housing, a pair of guide rails disposed laterally in said housing, at least one of said lens barrels being movable along said guide rails, and a pair of drive rods (5) in parallel with said guide rails and threadedly engaged with said lens barrels wherein said at least one said lens barrels is moved along the guide rails (4) in response to the rotation of the drive rods to vary the distance between said lens barrels.

2. The binoculars of claim 1 further comprising an adjustment rod disposed perpendicular to said drive rods and having worm gear threads operatively engaged with threads of said drive rods and a knob disposed for rotation by a user of said binoculars.

3. The binoculars of claim 2 wherein each of said guide rails has formed therein a groove and wherein each of said lens barrels includes at least one trapezoidal projection engaged with a corresponding one of the grooves.

4. The binoculars of any of claims 1 and 3 further comprising automatic focussing means.

* * * * *